United States Patent [19]

Gardner et al.

[11] Patent Number: 4,608,404
[45] Date of Patent: Aug. 26, 1986

[54] EPOXY COMPOSITIONS CONTAINING OLIGOMERIC DIAMINE HARDENERS AND HIGH STRENGTH COMPOSITES THEREFROM

[75] Inventors: Hugh C. Gardner, Somerville; George L. Brode, Bridgewater; Robert J. Cotter, Bernardsville, all of N.J.

[73] Assignee: Union Carbide Corporation, Danbury, Conn.

[21] Appl. No.: 728,469

[22] Filed: May 2, 1985

Related U.S. Application Data

[63] Continuation of Ser. No. 509,453, Jun. 30, 1983, abandoned.

[51] Int. Cl.<sup>4</sup> ............................................. C08G 59/50
[52] U.S. Cl. .................................... 523/400; 523/445; 523/458; 523/466; 523/468; 525/113; 525/389; 525/396; 525/398; 525/407; 525/415; 525/423; 525/438; 525/504; 525/523; 525/525; 528/90; 528/93; 528/109; 528/119; 528/129; 528/315; 528/418; 528/361

[58] Field of Search .............. 523/400, 445, 458, 466, 523/468; 525/504, 523, 396, 389, 398, 113, 423, 438, 407, 415, 525; 528/90, 93, 109, 119, 129, 315, 430

[56] References Cited

U.S. PATENT DOCUMENTS 3,895,064 7/1975 Brode et al. ...................... 564/315
3,920,768 11/1975 Kwiatkowski ...................... 528/99
3,950,451 4/1976 Suzuki et al. ...................... 528/124

Primary Examiner—Morton Foelak
Assistant Examiner—Kriellion Morgan
Attorney, Agent, or Firm—Morris N. Reinisch

[57] ABSTRACT

Described herein are compositions which contain a specific group of oligomeric diamine hardeners and epoxy compounds which when combined with structural fibers produce composites which have improved tensile properties, high compressive strengths, and improved impact resistance. These compositions also exhibit low moisture absorption.

40 Claims, No Drawings

EPOXY COMPOSITIONS CONTAINING OLIGOMERIC DIAMINE HARDENERS AND HIGH STRENGTH COMPOSITES THEREFROM

This application is a continuation of prior U.S. application Ser. No. 509,453, filed June 30, 1983, now abandoned.

BACKGROUND OF THE INVENTION

Advanced composites are high strength, high modulus materials which are finding increasing use as structural components in aircraft, automotive, and sporting goods applications. Typically they comprise structural fibers such as carbon fibers in the form of woven cloth or continuous filaments embedded in a thermosetting resin matrix.

Most advanced composites are fabricated from prepreg, a ready-to-mold sheet of reinforcement impregnated with uncured or partially cured resin. Resin systems containing an epoxide resin and aromatic amine hardener are often used in prepreg since they possess the balance of properties required for this composite fabrication process. State-of-the-art epoxy/carbon fiber composites have high compressive strengths, good fatigue characteristics, and low shrinkage during cure. However, since most epoxy formulations used in prepreg are brittle, these composites have poor impact resistance and tensile properties which do not fully translate the properties of the reinforcing fiber. In addition, epoxy formulations absorb moisture which reduces their high temperature properties. Thus there is a need for resin systems which afford composites with improved tensile and impact properties and reduced moisture absorption.

THE INVENTION

It has now been found that a composition which contains a specific group of hardeners and epoxy compounds when combined with structural fibers produces composites which have improved tensile properties and impact resistance. In addition these compositions exhibit low moisture absorption.

The composition of this invention comprises:
(a) a select group of diamine hardeners, and
(b) an epoxy resin containing two or more 1,2-epoxide groups per molecule.

These compositions may optionally contain
(c) a thermoplastic polymer, and/or
(d) a structural fiber.

The hardeners which are used in this invention are represented by the following general formulas:

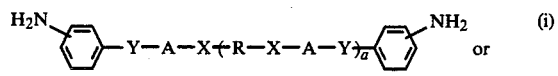  (i)

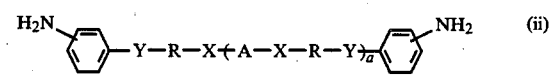  (ii)

or mixtures thereof, wherein X is O, S, SO or $SO_2$, Y is O or S, A is the residuum of a dihalobenzenoid compound such as

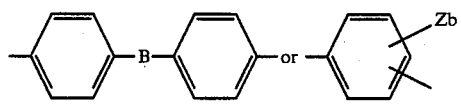

wherein B is $SO_2$,

—$C(CH_3)_2$, —$C(CF_3)_2$ or a direct bond, Z is halogen or nitrile, b is an integer of 1 to 4, R is the residuum of a dihydric phenol such as bisphenol A, hydroquinone, resorcinol, 4,4'-biphenol, 4,4'-dihydroxydiphenyl sulfone, 4,4'-dihydroxydiphenyl sulfide, 4,4'-dihydroxy-3,3',5,5'-tetramethyldiphenyl sulfide, 4,4'-dihydroxy-3,3',5,5'-tetramethyldiphenyl sulfone and the like, and a=0.05 to 20.

The preferred hardeners are the following

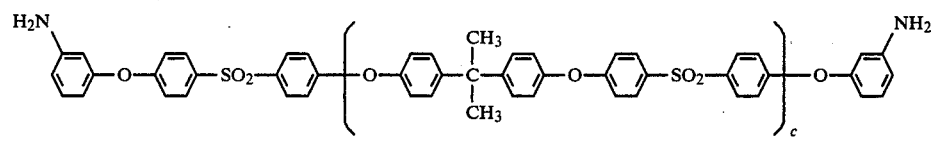

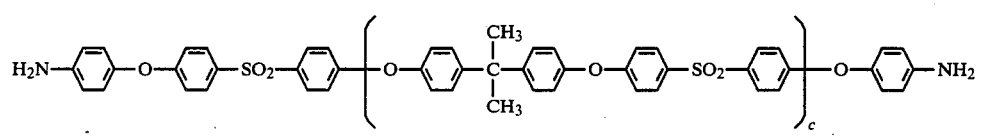

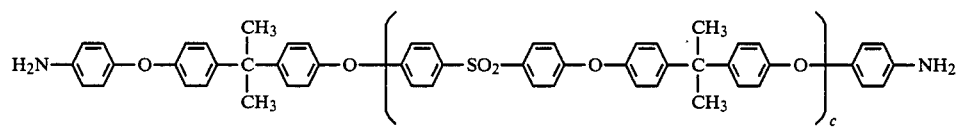

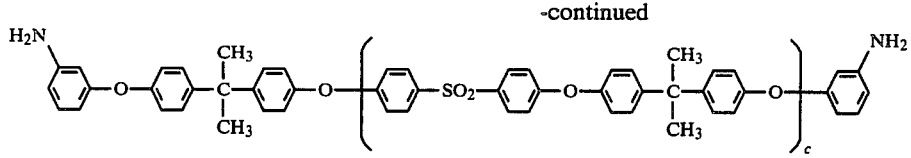

wherein c is 0.2 to 0.8

The oligomeric diamines of general formula i of this invention may be prepared by condensing an aminophenol, a dihalobenzenoid compound and an aromatic diphenol at elevated temperature in the presence of base in a dipolar aprotic solvent. Suitable aminophenols include m-aminophenol. p-aminophenol, and 4-aminothiophenol. Useful dihalobenzenoid compounds include 4,4'-dichlorodiphenyl sulfone, 4,4'-difluorobenzophenone, 4,4'-dichlorobenzophenone, 2,6-dichlorobenzonitrile, 1,2,4,5-tetrachlorobenzene, hexachlorobenzene, p-chloronitrobenzene, m-chloronitrobenzene, p-fluoro nitrobenzene, m-bromonitrobenzene, and the like. The process conditions for carrying out this reaction are similar to those for the preparation of diamines of general formula i, and are described in the Justus Leibigs Ann. Chem., vol.740, 1970, pages 169 to 179, which is incorporated herein by reference.

A diamine formed from p-chloronitrobenzene, 4,4'-dichlorodiphenyl sulfone and resorcinol with an average 'n' value of 0.5 may be prepared using the following stoichiometry:

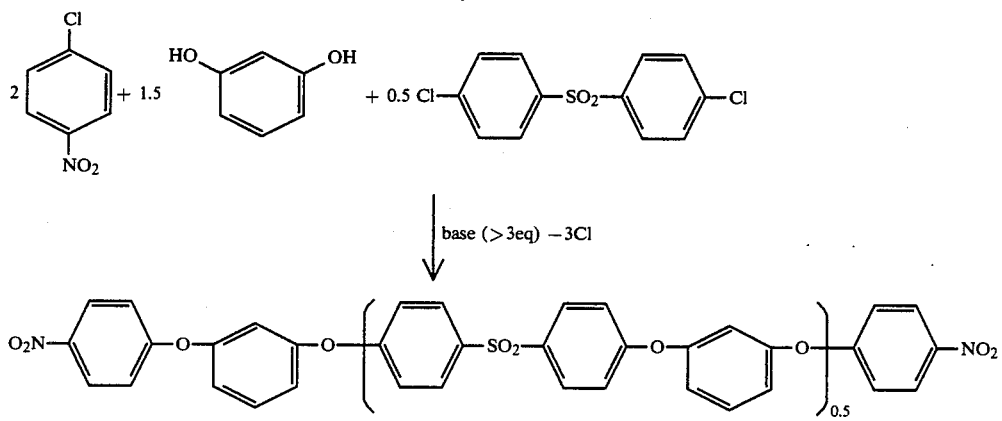

and the like. Suitable aromatic diphenols include bisphenol A, hydroquinone, resorcinol, 4,4'-biphenol, 4,4'-dihydroxydiphenyl sulfone, 4,4'-dihydroxydiphenyl sulfide, 4,4'-dihydroxy-3,3',5,5'-tetramethyldiphenyl sulfide, and the like. Bases which may be used include sodium hydroxide, potassium hydroxide, sodium carbonate, potassium carbonate, cesium carbonate, sodium bicarbonate, and the like. Dimethyl sulfoxide, N,N-dimethyl acetamide, N-methyl pyrrolidinone, sulfolane and dimethyl sulfone are suitable solvents. An azeotropic solvent such as toluene or chlorobenzene is preferably added to the mixture to assist in removal of water from the reaction mixture.

The preparation of the diamines of this invention may be carried out as described in U.S. Pat. No. 3,895,064. Alternatively the process conditions in British Pat. No. 1,492,366 may be used. Reaction times are typically 8 to 30 hours at temperatures of 140° to 170° C.

The diamines may be prepared by a one-step process in which the aminophenol, dihalobenzenoid compound, aromatic diphenol, and base are charged simultaneously to the reactor. Alternatively, a two step process may be used, in which the aminophenol, diphenol and base are be reacted initially to form phenoxide salts, prior to addition of the dihalobenzenoid compound.

The diamines of general formula ii may be prepared in a multistep process. In the first step a halonitrobenzene, dihydric phenol, and dihalobenzenoid compound are condensed in the presence of base to form a nitro-terminated oligomer. In this process, the dihydric phenol, dihalobenzenoid compound, and base have the same meaning as above. The halonitrobenzene may be The second step in the preparation of the diamine of general formula ii is the reduction of the terminal nitro groups to amino groups. This process may be carried out using methods known in the art—e.g., using hydrogen and a metal catalyst such as Fe or Ni, or by using stannous chloride and hydrochloric acid.

The oligomeric diamines of this invention comprise mixtures of compounds. For example, the product with an average 'a' value of 1 in either general formula i or ii contains compounds with 'a' values of 0, 1, 2 and 3 or more.

The diamines of this invention may be used in combination with conventional aromatic diamines. Examples of conventional diamines include 4,4'-diaminodiphenyl ether, 4,4'-diaminodiphenyl methane, 3,3'-diaminodiphenyl methane, 4,4'-diaminodiphenyl sulfone, 3,3'-diaminodiphenyl sulfone, 3,3'-diaminobenzophenone, m-phenylenediamine, p-phenylenediamine, 4,4'-diaminodiphenylpropane, 4,4'-diaminodiphenyl sulfide, 1,4-bis(p-aminophenoxy)benzene, 1,4-bis(m-aminophenoxy)benzene, 1,3-bis(m-aminophenoxy)benzene, 1,3-bis(p-aminophenoxy)benzene, 4,4'-bis(3-aminophenoxy)diphenyl sulfone, and trimethylene glycol di-4-aminobenzoate. Also, the hardeners of this invention may be used in combination with the diamine hardeners disclosed in U.S. patent application Ser. No. 496,504, now U.S. Pat. No. 4,517,321 filed on May 20, 1983 in the name of H. C. Gardner et al.

The epoxy resins which may be used herein contain two or more epoxy groups having the following formula:

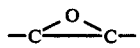

The epoxy groups can be terminal epoxy groups or internal epoxy groups. The epoxides are of two general types: polyglycidyl compounds or products derived from epoxidation of dienes or polyenes. Polyglycidyl compounds contain a plurality of 1,2-epoxide groups derived from the reaction of a polyfunctional active hydrogen containing compound with an excess of an epihalohydrin under basic conditions. When the active hydrogen compound is a polyhydric alcohol or phenol, the resulting epoxide composition contains glycidyl ether groups. A preferred group of polyglycidyl compounds are made via condensation reactions with 2,2-bis(4-hydroxyphenyl)propane, also known as bisphenol A, and have structures such as II,

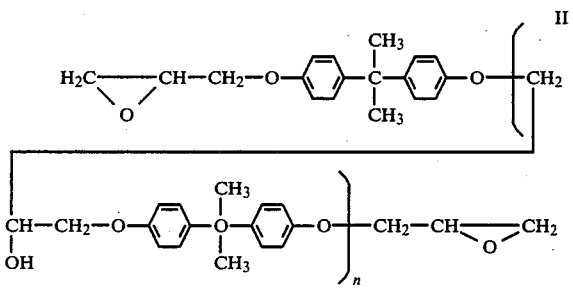

where n has a value from about 0 to about 15. These epoxides are bisphenol-A epoxy resins. They are available commercially under the trade names such as "Epon 828," "Epon 1001", and "Epon 1009" from Shell Chemical Co. and as "DER 331", "DER 332", and "DER 334" from Dow Chemical Co. The most preferred bisphenol A epoxy resins have an "n" value between 0 and 10.

Polyepoxides which are polyglycidyl ethers of 4,4'-dihydroxydiphenyl methane, 4,4'-dihydroxydiphenyl sulfone, 4,4'-biphenol, 4,4'-dihydroxydiphenyl sulfide, phenolphthalein, resorcinol, 4,2'-biphenol, or tris(4-hydroxyphenyl)methane and the like, are useful in this invention. In addition, EPON 1031 (a tetraglycidyl derivative of 1,1,2,2-tetrakis(hydroxyphenyl)ethane from Shell Chemical Company), and Apogen 101, (a methylolated bisphenol A resin from Schaefer Chemical Co.) may also be used. Halogenated polyglycidyl compounds such as D.E.R. 580 (a brominated bisphenol A epoxy resin from Dow Chemical Company) are also useful. Other suitable epoxy resins include polyepoxides prepared from polyols such as pentaerythritol, glycerol, butanediol or trimethylolpropane and an epihalohydrin.

Polyglycidyl derivatives of phenol-formaldehyde novolaks such as III where n=0.1 to 8 and cresol-formaldehyde novolaks such as IV where n=0.1 to 8 are also useable.

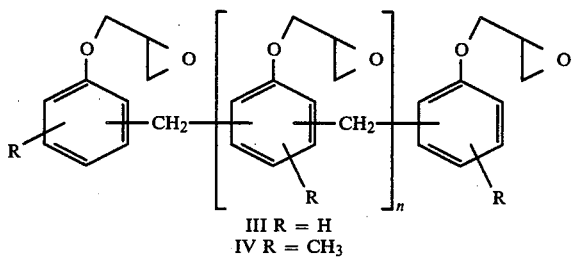

III R = H
IV R = $CH_3$

The former are commercially available as D.E.N. 431, D.E.N. 438, and D.E.N. 485 from Dow Chemical Company. The latter are available as, for example, ECN 1235, ECN 1273, and ECN 1299 (obtained from Ciba-Geigy Corporation, Ardsley, NY). Epoxidized novolaks made from bisphenol A and formaldehyde such as SU-8 (obtained from Celanese Polymer Specialties Company, Louisville, KY) are also suitable.

Other polyfunctional active hydrogen compounds besides phenols and alcohols may be used to prepare the polyglycidyl adducts of this invention. They include amines, aminoalcohols and polycarboxylic acids.

Adducts derived from amines include N,N-diglycidyl aniline, N,N-diglycidyl toluidine, N,N,N',N'-tetraglycidylxylylene diamine, (i.e., V) N,N,N',N'-tetraglycidyl-bis(methylamino)cyclohexane (i.e. VI), N,N,N',N'-tetraglycidyl-4,4'-diaminodiphenyl methane, (i.e. VII) N,N,N',N'-tetraglycidyl-3,3'-diaminodiphenyl sulfone, and N,N'-dimethyl-N,N'-diglycidyl-4,4'-diaminodiphenyl methane. Commercially available resins of this type include Glyamine 135 and Glyamine 125 (obtained from F.I.C. Corporation, San Francisco, CA.), Araldite MY-720 (obtained from Ciba Geigy Corporation) and PGA-X and PGA-C (obtained from The Sherwin-Williams Co., Chicago, Ill.).

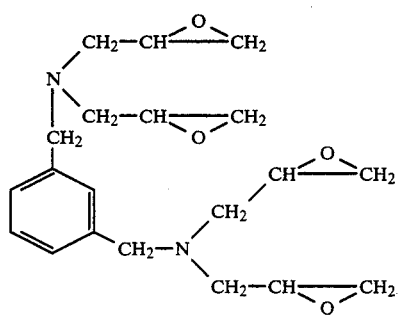

V

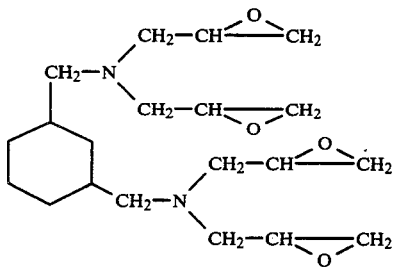

VI

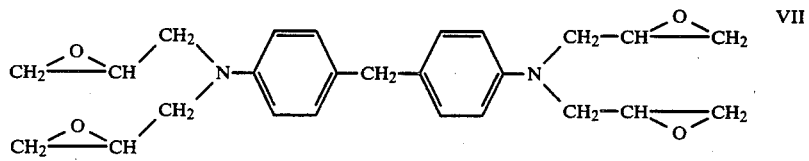

VII

Suitable polyglycidyl adducts derived from amino alcohols include O,N,N-triglycidyl-4-aminophenol, available as Araldite 0500 or Araldite 0510 (obtained from Ciba Geigy Corporation) and O,N,N-triglycidyl-3-aminophenol (available as Glyamine 115 from F.I.C. Corporation).

Also suitable for use herein are the glycidyl esters of carboxylic acids. Such glycidyl esters include, for example, diglycidyl phthalate, diglycidyl terephthalate, diglycidyl isophthalate, and diglycidyl adipate. There may also be used polyepoxides such as triglycidyl cyanurates and isocyanurates, N,N-diglycidyl oxamides, N,N'-diglycidyl derivatives of hydantoins such as "XB 2793" (obtained from Ciba Geigy Corporation), diglycidyl esters of cycloaliphatic dicarboxylic acids, and polyglycidyl thioethers of polythiols.

Other epoxy-containing materials are copolymers of acrylic acid esters of glycidol such as glycidyl acrylate and glycidyl methacrylate with one or more copolymerizable vinyl compounds. Examples of such copolymers are 1:1 styrene-glycidyl methacrylate, 1:1 methyl methacrylate-glycidyl acrylate and 62.5:24:13.5 methyl methacrylate:ethyl acrylate:glycidyl methacrylate.

Silicone resins containing epoxy functionality, e.g., 2,4,6,8,10-pentakis[3-(2,3-epoxypropoxy)propyl]-2,4,6,8,10-pentamethylcyclopentasiloxane and the diglycidyl ether of 1,3-bis-(3-hydroxypropyl)tetramethyldisiloxane) are also useable.

The second group of epoxy resins is prepared by epoxidation of dienes or polyenes. Resins of this type include bis(2,3-epoxycyclopentyl)ether, VIII,

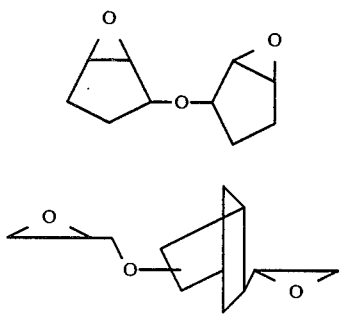

VIII

IX copolymers of VIII with ethylene glycol which are described in U.S. Pat. No. 3,398,102, 5(6)-glycidyl-2-(1,2-epoxyethyl)bicyclo[2.2.1]heptane, IX, and dicyclopentadiene diepoxide. Commercial examples of these epoxides include vinycyclohexene dioxide, e.g., "ERL-4206" (obtained from Union Carbide Corp.), 3,4-epoxycyclohexylmethyl 3,4-epoxycyclohexane carboxylate, e.g., "ERL-4221" (obtained from Union Carbide Corp.), 3,4-epoxy-6-methylcyclohexylmethyl 3,4-epoxy-6-methylcyclohexane carboxylate, e.g., "ERL-4201" (obtained from Union Carbide Corp.), bis(3,4-epoxy-6-methylcyclohexylmethyl)adipate, e.g., "ERL-4289" (obtained from Union Carbide Corp.), dipentene dioxide, e.g., "ERL-4269" (obtained from Union Carbide Corp.) 2-(3,4-epoxycyclohexyl-5,5-spiro-3,4-epoxy)cyclohexanemetadioxane, e.g., "ERL-4234" (obtained from Union Carbide Corp.) and epoxidized polybutadiene, e.g., "Oxiron 2001" (obtained from FMC Corp.)

Other suitable cycloaliphatic epoxides include those described in U.S. Pat. Nos. 2,750,395; 2,890,194; and 3,318,822 which are incorporated herein by reference, and the following:

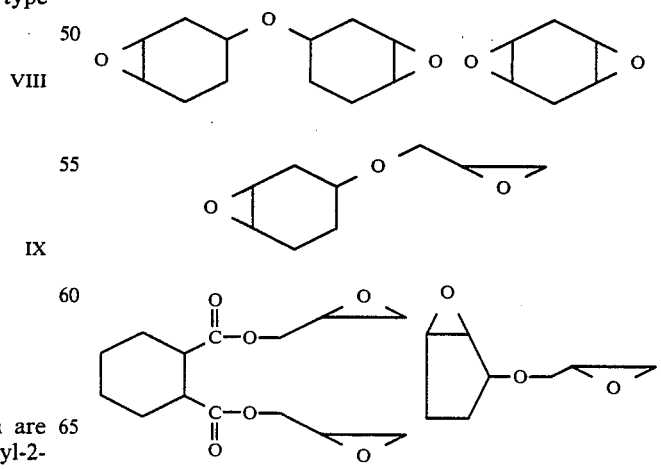

Other suitable epoxides include:

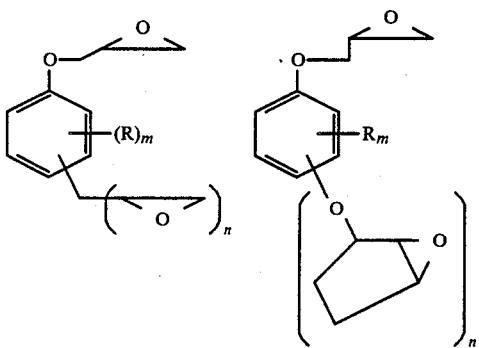

wherein n is 1 to 4, m is (5−n), and R is H, halogen, or $C_1$ to $C_4$ alkyl.

Reactive diluents containing one epoxide group such as t-butylphenyl glycidyl ether, may also be used. The reactive diluent may comprise up to 25 percent by weight of the epoxide component.

The preferred epoxy resins are bis(2,3-epoxycyclopentyl)ether, bisphenol A epoxy resins of formula II where n is between 0 and 5, epoxidized novolak resins of formula III and IV where n is between 0 and 3, N,N,N',N'-tetraglycidyl xylylene diamine, mixtures of bis(2,3-epoxycyclopentyl)ether with II, III, or IV, and N,N,N',N'-tetraglycidyl 4,4'-diamino diphenyl methane.

The compositions of this invention may optionally contain a thermoplastic polymer (component c). These materials have beneficial effects on the viscosity and film strength characteristics of the epoxy/hardener mixture (i.e., components a and b).

The thermoplastic polymer used in this invention include polyarylethers of formula X which are described in U.S. Pat. Nos. 4,108,837 and 4,175,175,

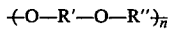     X wherein R' is a residuum of a dihydric phenol such as bisphenol A, hydroquinone, resorcinol, 4,4-biphenol, 4,4'-dihydroxydiphenyl sulfone, 4,4'-dihydroxy-3,3'5,5'-tetramethyldiphenyl sulfide, 4,4'-dihydroxy-3',3',5,5'-tetramethyldiphenyl sulfone and the like. R" is a residuum of a benzenoid compound susceptible to nucleophilic aromatic substitution reactions such as 4,4'-dichlorodiphenyl sulfone, 4,4'-difluorobenzophenone, and the like. The average value of n is from about 8 to about 120.

These polymers may have terminal groups which react with epoxy resin, such as hydroxyl or carboxyl, or terminal groups which do not react.

Other suitable polyarylethers are described in U.S. Pat. No. 3,332,209.

Also suitable are polyhydroxyethers of formula XI.

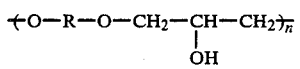     XI where R has the same meaning as for Formula X and the average value of n is between about 8 and about 300; and polycarbonates such as those based on bisphenol A, tetramethyl bisphenol A, 4,4'-dihydroxydiphenyl sulfone, 4,4'-dihydroxy-3,3',5,5'tetramethyl-diphenyl sulfone, hydroquinone, resorcinol, 4,4'-dihydroxy-3,3',5,5'-tetramethyl diphenyl sulfide, 4,4'biphenol, 4,4'-dihydroxydiphenyl sulfide, phenolphthalein, 2,2,4,4-tetramethyl-1,3-cyclobutane diol, and the like. Other suitable thermoplastics include ply (ε-caprolactone); polybutadiene; polybutadiene/acrylonitrile copolymers, including those optionally containing amine, carboxyl, hydroxy, or —SH groups; polyesters, such as poly(butylene terephthalate); poly(ethylene terephthalate); polyetherimides such as the Ultem resins (obtained from the General Electric Company); acrylontrile/butadiene/styrene copolymers, polyamides such as nylon 6, nylon 6,6, nylon 6,12, and Trogamid T (obtained from Dynamit Nobel Corporation); poly(amide imides) such as Torlon poly(amide imide) (obtained from Amoco Chemical Corporation, Napierville, IL); polyolefins, polyethylene oxide; poly(butyl methacrylate); impact-modified polystyrene; sulfonated polyethylene; polyarylates such as those derived from bisphenol A and isophthalic and terephthalic acid; poly(2,6-dimethyl phenylene oxide); polyvinyl chloride and its copolymers; polyacetals; polyphenylene sulfide and the like.

The composition may additionally contain an accelerator to increase the rate of cure. Accelerators which may be used herein include Lewis acid:amine complexes such as $BF_3$.monoethylamine, $BF_3$.piperidine, $BF_3$.2-methylimidazole; amines, such as imidazole and its derivatives such as 4-ethyl-2-methylimidazole, 1-methylimidazole, 2-methylimidazole; N,N-dimethylbenzylamine; acid salts of tertiary amines, such as the p-toluene sulfonic acid:imidazole complex, salts of trifluoro methane sulfonic acid, such as FC-520 (obtained from 3M Company), organophosphonium halides and dicyandiamide.

The structural fibers (i.e. component d) which are useful in this invention include carbon, graphite, glass, silicon carbide, poly(benzothiazole), poly(benzimidazole), poly(benzoxazole), alumina, titania, boron, and aromatic polyamide fibers. These fibers are characterized by a tensile strength of greater than 100,000 psi, a tensile modulus of greater than two million psi, and a decomposition temperature of greater than 200° C. The fibers may be used in the form of continuous tows (1000 to 400,000 filaments each), woven cloth, whiskers, chopped fiber or random mat. The preferred fibers are carbon fibers, aromatic polyamide fibers, such as Kevlar 49 fiber (obtained from E. I. duPont de Nemours, Inc., Wilmington, DE), and silicon carbide fibers.

The compositions contain 5 to 70 weight percent, preferably 15 to 60 percent, of hardener (i.e., component a), 5 to 75 percent, preferably 10 to 50 percent, of component b, and 0 to about 25 percent, preferably 0 to 15 percent by weight of component c, and 0 to 85 percent, preferably 20 to 80 percent of component d.

Preimpregnated reinforcement may be made from the compositions of this invention by combining components (a+b) with d or components (a+b+c) with d.

Preimpregnated reinforcement may be prepared by several techniques known in the art, such as wet winding or hot melt. In one method of making impregnated tow or unidirectional tape, the fiber is passed into a bath of the epoxy/hardener mixture. A non-reactive, volatile solvent such as methyl ethyl ketone may be optionally included in the resin bath to reduce viscosity. After impregnation, the reinforcement is passed through a die to remove excess resin, sandwiched between plies of release paper, passed through a set of heated rollers, cooled, and taken up on a spool. It is used within a few days or may be stored for months at 0° F.

During prepreg manufacture, the resin system "B-stages", or partially advances.

Composites may be prepared by curing preimpregnated reinforcement using heat and pressure. Vacuum bag/autoclave cures work well with these compositions. Laminates may also be prepared via wet layup followed by compression molding, resin transfer molding, or by resin injection, as described in European Patent Application 0019149 published Nov. 26, 1980. Typical cure temperatures are 100° F. to 500° F., preferably 180° F. to 450° F.

The compositions of this invention are well suited for filament winding. In this composite fabrication process, continuous reinforcement in the form of tape or tow—either previously impregnated with resin or impregnated during winding—is placed over a rotating and removable form or mandrel in a previously determined pattern. Generally the shape is a surface of revolution and contains end closures. When the proper number of layers are applied, the wound form is cured in an oven or autoclave and the mandrel removed.

Tacky drapable prepreg can be obtained with a wide variety of epoxy resins. Due to the low room temperature (25° C.) reactivity of the hardeners of this invention, long prepreg shelf lives can be obtained-typically one to three weeks.

For filament winding and wet layup, the preferred resin composition comprises epoxy resins selected from bis(2,3-epoxycyclopentyl)ether, bisphenol A epoxy resins of Formula II, where n=0 to 6, N,N,N',N'-tetraglycidylxylylene diamine, epoxidized novolak resins of Formulas III and IV, where n=0 to 3, and O,N,N-triglycidyl-4-aminophenol. The preferred epoxy resin mixtures have viscosities less than 30,000 centipoises at 70° C.

For all prepreg and composite formulations, the preferred molar ratio of N-H groups in the hardener to 1,2-epoxide groups in the epoxy resin is 0.5 to 1.5.

The compositions of this invention may be used as aircraft parts such as wing skins, wing-to-body fairings, floor panels, flaps, radomes; as automotive parts such as driveshafts, bumpers, and springs; and as pressure vessels, tanks and pipes. They are also suitable for protective armor on military vehicles and sporting goods applications such as golf shafts, tennis rackets, and fishing rods.

In addition to structural fibers, the composition may also contain particulate fillers such as talc, mica, calcium carbonate, aluminum trihydrate, glass microballoons, phenolic thermospheres, and carbon black. Up to half of the weight structural fiber in the composition may be replaced by filler. Thixotropic agents such as fumed silica may also be used.

EXAMPLES

The following examples serve to give specific illustrations of the practice of this invention but they are not intended in any way to limit the scope of this invention.

The following designations used in the Examples have the following meaning:

The epoxy equivalent weight (EEW) is the grams of epoxy resin per mole of 1,2-epoxide group.

Polysulfone: a polymer of the following formula:

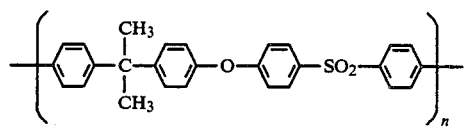

Udel Polysulfone P-1800 (obtained from Union Carbide Corporation) having a number average molecular weight of about 24,000.

Phenoxy—a polymer with the following formula:

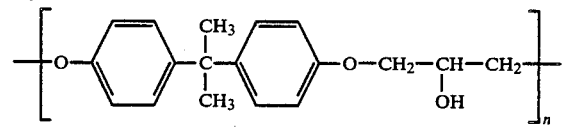

Ucar Phenoxy PKHH (obtained from Union Carbide Corporation) having a number average molecular weight of about 24,000.

Examples 1 through 5 describe the preparation of oligomeric diamines of this invention. Table 1 summarizes the reagents used in and products of Examples 1 through 5. For all Examples, the recovered yields were 70 to 90 percent of theory.

EXAMPLE 1

A 5 liter flask equipped with a paddle stirrer, thermometer with Therm-o-watch controller, claisen adapter with a nitrogen inlet and a distillation column leading to a Dean-Stark trap, and an electric heating mantle was charged with the following:
389 g of pulverized potassium carbonate,
538.5 g of 4,4-dichlorodiphenyl sulfone,
85.6 g of bisphenol A,
400 ml of toluene, and
1300 ml of N,N-dimethyl acetamide.

The mixture was stirred, purged with nitrogen, and heated to 70° C. After 15 minutes, 344 g of m-aminophenol was added. The mixture was heated to 160° C. as a toluene/water azeotrope was collected in the trap. The toluene in the distillate was recycled once the system reached 155° C. The mixture was maintained at 155° to 162° C. for 9 hours. It was then cooled to room temperature (about 25° C.) and filtered. The filtrate weighed 1821 g. An 800 g portion of the filtrate was heated under vacuum to remove 280 g of volatiles. The residue was dissolved in 2 liters of dichloromethane in a Morton flask with a paddle stirrer. This solution was washed 3 times with 2 liter portions of distilled water. The washed organic layer was filtered and concentrated on a rotary evaporator. Final removal of dichloromethane was accomplished by heating the concentrate over a 2 day period in shallow pans in a vacuum oven. The oven temperature was slowly raised from 25° C. to 65° C. to control foaming. The final product, an oligomeric diamine, had a melting range of 80° to 92° C. Titration of the diamine using perchloric acid showed that the weight per —$NH_2$ was 254 g/mole. The yield of recovered product was about 250 g.

EXAMPLE 2

A 30-gallon, glass-lined reactor equipped with an agitator, distillation column, inlet and outlet for inert gas, and a receiver was charged with the reagents listed in Table I. Six hours after the mixture of dichlorodiphenyl sulfone, bisphenol A, and potassium carbonate in toluene/N,N-dimethyl acetamide had been heated at by precipitating the filtered reaction mixture into water (1/10 by volume) in a Waring blender.

TABLE I

OLIGOMERIC DIAMINES

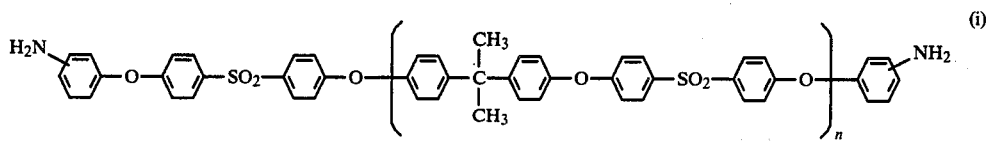

| EXAMPLE NO. | 1 | 2 | 3 | 4 | 5 |
| --- | --- | --- | --- | --- | --- |
| Reagents | | | | | |
| 4,4'-dichlorodiphenyl sulfone (g) | 538.5 | 21,370 | 603 | 603 | 603 |
| bisphenol A (g) | 85.6 | 5,660 | 205 | 205 | 205 |
| m-aminophenol (g) | 344 | 11,150 | 274 | 274 | — |
| p-aminophenol (g) | — | — | — | — | 274 |
| potassium carbonate (g) | 389 | 11,310 | 435 | 435 | 435 |
| toluene (ml) | 400 | 11,430 | 400 | 400 | 400 |
| N,N—dimethyl acetamide (ml) | 1300 | 37,520 | 1400 | 1400 | 1400 |
| Reaction Conditions | | | | | |
| Mode[a] | simultaneous | staggered[b] | simultaneous | staggered[c] | staggered[b,d] |
| Hrs at 155–160° C. | 9 | 17.8 | 13.5 | 11 | 18 |
| Theoretical yield (g) | 811 | 32,390 | 917 | 917 | 917 |
| PRODUCT PROPERTIES | | | | | |
| Theoretical $M_n$ | 543 | 653 | 764 | 764 | 764 |
| Theoretical value of 'n' in (i) | 0.25 | 0.50 | 0.75 | 0.75 | 0.75 |
| Melting point (°C.) | 80–92 | 67–79[e] | 88–96 | 104–106[f] | 124–133 |
| Wt per —NH$_2$ (g/mole) | 254 | 333 | 370 | 390 | 410 |

[a]Simultaneous: All reagents charged at start of reaction. Staggered: Aminophenol added later.
[b]Aminophenol added 6 hours after bisphenol A/dichlorodiphenyl sulfone/K$_2$CO$_3$ mixture was reacted at 155–160° C. Reaction carried out in a 30 gallon reactor.
[c]Aminophenol added 4 hours after bisphenol A/dichlorodiphenyl sulfone/K$_2$CO$_3$ mixture was reacted at 155–160° C.
[d]Product recovered by precipitation of filtered reaction solution into water.
[e]Product contained 2.3 wt. % of DMAC
[f]Product contained 0.8 wt. % of DMAC 155° to 160° C., m-aminophenol was added. The mixture was heated for an additional 12.8 hours before being cooled and filtered. The filtrate was diluted with methylene chloride so that the approximate composition was 16 percent (by weight) oligomeric diamine, 16 percent N,N-dimethyl acetamide, and 68 percent methylene chloride. This solution was washed with water in a 20-tray rotating disc contactor (RDC) column. After 2 passes, the dimethylacetamide content of the organic phase was reduced to 2.5 percent. The washed organic layer was concentrated under vacuum, poured into shallow pans, and slowly heated under vacuum as described above to remove dichloromethane. The final product was a tan solid with a melting range of 67° to 79° C. and a weight per —NH$_2$ group of 333 g/mole.

EXAMPLE 3

An oligomeric diamine with a titrated weight per —NH$_2$ group of 370 g/mole was prepared and recovered in a manner similar to the diamine of Example 1.

EXAMPLE 4

An oligomeric diamine with a titrated weight per —NH$_2$ group of 390 g/mole was prepared and recovered in a manner similar to that of Example 1, except that the addition of m-aminophenol was delayed until 4 hours after the dichlorodiphenyl sulfone, bisphenol A, potassium carbonate mixture in N,N-dimethyl acetamide/toluene had reacted at 155° to 160° C.

EXAMPLE 5

An oligomeric diamine with a titrated weight per —NH$_2$ group of 410 was prepared by the procedure of Example 4, except that p-aminophenol was used in place of m-aminophenol. The product was recovered

EXAMPLE 6

A thermosetting composition was prepared by combining 50.0 g of bis (2,3-epoxycyclopentyl)ether and 66.8 g of the oligomeric diamine of Example 1.

EXAMPLE 7

A thermosetting composition was prepared by combining 36.0 g of bis(2,3-epoxycyclopentyl)ether, 24.0 g of a bisphenol A epoxy resin (EEW 189) and 64.7 of the oligomeric diamine of Example 1.

EXAMPLE 8

A thermosetting composition was prepared by combining 39.0 g of bis(2,3-epoxycyclopentyl)ether and 80.0 g of the oligomeric diamine of Example 3.

EXAMPLE 9

A thermosetting composition was prepared by combining 70.0 g of a bisphenol A epoxy resin (EEW 189) with 74.0 g of an oligomeric diamine prepared by the procedure of Example 4. This diamine had a weight per —NH$_2$ group of 400 g/mole.

EXAMPLE 10

A thermosetting composition was prepared by combining 34.4 g of bis(2,3-epoxycyclopentyl)ether, 8.9 g of a bisphenol A epoxy resin (EEW 189), and 88.0 g of the oligomeric diamine of Example 3.

EXAMPLE 11

A thermosetting composition was prepared by combining 18.2 g of bis(2,3-epoxycyclopentyl)ether, 12.1 g of a bisphenol A epoxy resin (EEW 189), and 50.0 g of the oligomeric diamine of Example 4.

EXAMPLE 12

A thermosetting composition was prepared by combining 44.8 g of bis(2,3-epoxycyclopentyl)ether, 11.2 g of N,N,N',N'-tetraglycidyl diaminodiphenyl methane (i.e. MY-720 from Ciba-Geigy Corp.), 61.6 g of the oligomeric diamine of Example 4, and 25.8 g of 4,4'-bis(3-aminophenoxy)diphenyl sulfone.

EXAMPLE 13

A thermosetting composition was prepared by combining 25.0 g of bis(2,3-epoxycyclopentyl)ether, 16.7 g of a bisphenol A epoxy resin (EEW 189), and 90 g of the oligomeric diamine of Example 5.

Examples 14 and 15 describe compositions containing thermoplastics.

EXAMPLE 14

A mixture of 1466 g of bis(2,3-epoxy cyclopentyl)ether and 200 g of Phenoxy was heated to 130° C. and stirred for 1.7 hour until the Phenoxy dissolved. The mixture was then cooled to 70° C. and blended with 366 g of N,N-diglycidyl ortho-toluidine (Glyamine 135 from F.I.C. Corporation). A thermosetting composition was prepared by combining 66.9 g of the epoxy/thermoplastic solution with 50.6 g of the oligomeric diamine of Example 2 and 33.7 g of 4,4'-bis(3-aminophenoxy)-diphenyl sulfone.

EXAMPLE 15

A solution of thermoplastic in epoxy resin was prepared by heating a mixture of 44.8 g of bis(2,3-epoxycyclopentyl)ether, 11.2 g of Dow D.E.N. 438 epoxy novolak resin, and 4.0 g of Polysulfone at 130° C. for 1 hour. To prepare a thermosetting resin composition, the above solution was combined with 55.5 g of the oligomeric diamine of Example 3 and 23.8 g of 4,4'-bis(3-aminophenoxy)-diphenyl sulfone.

EXAMPLES 16 THROUGH 25

Unreinforced castings were prepared from the formulations described in Examples 6 through 15. Typical castings weighed 100 to 160 g and were made using the proportions given in the above Examples. Casting dimensions were ⅛×8×5 to 8 inches.

The general procedure for making castings was as follows: The epoxy resin, optionally containing a thermoplastic, was charged to a 3-necked flask equipped with a paddle stirrer. The contents of the flask were heated to 120° to 130° C. and stirred. The amine hardener was added to this solution as a fine powder. It dissolved in about five minutes. The resulting solution was subjected to a vacuum of about 25 inches of mercury for three minutes with agitation, followed by two minutes without agitation. It was then poured into a glass mold with a cavity of dimensions ⅛×8×8 inches, and cured with a programmed heating cycle: 16 to 21 hours at 105° C., 8 hours at 140° C., and finally 16° hours at 175° C.

Castings were tested to determine tensile properties, heat deflection temperature and water sensitivity. For the latter, the change in weight on immersion of tensile bars in 160° F. water after two weeks was recorded. Tensile properties were measured according to ASTM D-638 using a Type 1 dogbone specimen. Heat deflection temperatures were measured according to ASTM D-648 (264 psi stress).

Table II summarizes the properties of unreinforced castings. These materials have low water absorption, high tensile strengths, and high tensile moduli compared to castings of many other epoxy formulations.

TABLE II

| | UNREINFORCED CASTING PROPERTIES ||||||||||
| | EXAMPLE ||||||||||
| | 16 | 17 | 18 | 19 | 20 | 21 | 22 | 23 | 24 | 25 |
| Resin Example | 6 | 7 | 8 | 9 | 10 | 11 | 12 | 13 | 14 | 15 |
| Casting Properties | | | | | | | | | | |
| Tensile Strength ($10^3$ psi) | 11.3 | 11.8 | 8.5 | 12.0 | 11.3 | 9.2 | 9.9 | 7.0 | 10.7 | 8.9 |
| Tensile Modulus ($10^5$ psi) | 6.7 | 6.1 | 5.9 | 4.3 | 5.8 | 5.6 | 6.1 | 4.1 | 6.4 | 7.1 |
| Elongation (%) | 1.9 | 2.3 | 1.6 | 4.1 | 2.4 | 1.9 | 1.8 | 2.0 | 2.0 | 1.5 |
| Heat Deflection Temperature (°C.) | 143 | 139 | 139 | 160 | 142 | 157 | 163 | 178 | 145 | 156 |
| Water Absorption (%) (2 wks. 160° F.) | 3.2 | 2.5 | 2.5 | 1.3 | 2.3 | — | 2.3 | 2.0 | 2.7 | 2.3 |

EXAMPLES 26 AND 27

Examples 26 and 27 describe experiments to study the film forming characteristics of compositions of this invention. Formulations which afford a uniform thin film with light tack are desired for making prepreg by the hot melt transfer process.

EXAMPLE 26

To a 2 ounce square jar was added 4.48 g of bis(2,2-epoxycyclopentyl)ether and 1.12 g of a bisphenol A epoxy resin (EEW 189). The jar was immersed in an oil bath at 120° C. Then 9.84 g of the oligomeric diamine of Example 3 and 0.98 g of amine-terminated butadiene/acrylonitrile liquid rubber (Type ATBN 1300×21 from B. F. Goodrich Co., Cleveland, OH) were added. The mixture was agitated and held at 120° C. After 1 hour, a sample was removed from the jar, poured onto release paper, and drawn down into a uniform film.

EXAMPLE 27

The procedure in Example 26 was repeated using the following resin formulation:
3.60 g of bis(2.3-epoxycyclopentyl)ether,
0.90 g of Glyamine 135,
0.49 g of Phenoxy,
5.52 g of the oligomeric diamine of Example 2, and
1.38 g of 4,4'-bis(3-aminophenoxy)diphenyl sulfone
After 1 hour at 120° C. a sample was removed, poured onto release paper, and drawn down to a tacky, uniform film.

Example 28 describes the preparation of undirectional epoxy/graphite prepreg.

EXAMPLE 28

A thermosetting composition as that of Example 11 was prepared by blending 182 g of bis(2,3-epoxycyclopentyl)ether, 121 g of a bisphenol A epoxy resin (EEW 189), and 500 g of the oligomeric diamine of Example 4 at 110° C. for approximately 20 minutes. The mixture was then cooled to 70° C. in approximately 20 minutes. After the mixture cooled to 70° C., it was coated on 8 inch wide release paper (type 2-65KG-157 and 99A, obtained from Daubert Coated Products Dixon, IL) at a coating weight of 0.024 lb/sq ft.

Six-inch wide undirectional prepreg tape was made by forming a ribbon of 110 tows of carbon fiber and contacting it between 2 plies of epoxycoated release paper in a prepreg machine. In the prepreg machine, the sandwich of fiber and coated release paper passed over a series of heated rollers to melt the resin into the fibers. The finished tape contained about 55 percent by weight of fiber. Its thickness was about 0.010 inches. The fiber was a polyacrylonitrile-based fiber with a tensile strength of $5.00 \times 10$ psi and a tensile modulus of $34 \times 10^6$ psi.

EXAMPLE 29

Six inch wide unidirectional tape was prepared using the resin formulation of Example 12. The epoxy/hardener mixture was heated at $115° \pm 5°$ C. for 1 hour to advance it prior to coating. A control prepreg was also prepared using a state-of-the-art prepreg resin. (see Table III)

The prepregs in Example 29 and the control had a nominal thickness of about 0.006 inches. Both contained approximately 60 percent by weight of fiber and were made with a carbon fiber with a tensile strength of $6.6 \times 10^5$ psi and a tensile modulus of $35 \times 10^6$ psi.

TABLE III

| | Example No. | |
|---|---|---|
| | 29 | CONTROL A |
| Examples for resin formulation | 12 | —[a] |
| Preadvancement Conditions | 60 min 115 ± 5° C. | 60 min 105° ± 5° C. |

[a] A state-of-the-art prepreg resin formulation of: 100 parts N,N,N',N—tetraglycidyl diamino diphenyl methane (MY-720, from Ciba-Geigy Corp.) 13 parts bisphenol A epoxidized novolak (SU-8, from Celanese Polymer Specialities Company, Lousiville, KY), and 32 parts 4,4'-diaminodiphenyl sulfone

EXAMPLES 30 AND 31

Examples 30 and 31 describe the cured laminates made from the prepreg of Examples 28 and 29, and the control. The laminates were cured in an autoclave using bleeder cloths to absorb excess resin. Between 5 and 10 plies of prepreg were used to make each specimen. Tensile properties were measured according to ASTM-D3039. Compressive properties were measured using a modified ASTM-D695 procedure. Unidirectional graphite/epoxy tabs were added to prevent the sample ends from crushing in a noncompressive failure mode. A gage length of approximately 0.190 inches was used. End tabs on compressive samples were adhered using FM-300 film adhesive (obtained from American Cyanamid Company, Havre de Grace, MD), which was cured at 177° C. for 1 hour.

Table IV summarizes the longitudinal properties measured on unidirectional laminates. It is clear that these compositions have excellent tensile and compressive properties. The tensile properties of the laminate made with Fiber B are significantly higher for the resin formulation of this invention than for the laminate made with the Control resin. The retention of compressive properties for the prepreg of Example 28 in the hot/wet condition is excellent.

TABLE IV

PROPERTIES OF UNIDIRECTIONAL LAMINATES[a]

| | EXAMPLE | | |
|---|---|---|---|
| | 30 | 31 | CONTROL |
| PREPREG EXAMPLE | 28 | 29 | — |
| CURE SCHEDULE[b] | I | II | II |
| PROPERTIES | | | |
| TENSILE STRENGTH ($10^3$ psi) | 240 | 355 | 262 |
| TENSILE MODULUS ($10^6$ psi) | 19.9 | 19.1 | 18.2 |
| STRAIN TO FAILURE (%) | 1.18 | 1.63 | 1.33 |
| COMPRESSIVE STRENGTH ($10^3$ psi) | | | |
| AT ROOM TEMPERATURE | 200 | 210 | 220 |
| HOT/WET[c] | 190 | — | — |
| FIBER TYPE[d] | A | B | B |

[a] Normalized to 60 volume percent fiber
[b] Cure Schedule I:
Room temperature to 135° C. at 2° C./min Hold 90 min at 135° C. Apply 85 psi pressure Hold 105 min at 135° C. 135° C. to 179° C. at 1° C./min Hold at 179° C. for 2 hours.
Cure Schedule II
Apply vacuum Room temperature to 135° C. at 2° C./min Apply 90 psi pressure Hold at 135° C. for 3 hours 135 to 179° C. at 1° C./min Hold 8 hours at 179° C.
[c] At 200° F., after immersion in 160° F. water for two weeks
[d] FIBER A: PAN-Based carbon fiber, 6K, tensile strength: 5.0 × $10^5$ psi; tensile modulus: 34 × $10^6$ psi, yield: 0.39 gram/meter
FIBER B: PAN-Based carbon fiber, 6K, tensile strength 6.6 × $10^5$ psi; tensile modulus: 35 × $10^6$ psi, yield: 0.31 grams/meter

EXAMPLE 32

Example 32 shows the compressive strength after impact of a quasiisotropic laminate fabricated with the composition of this invention and with the control. This test measures the damage tolerance of composites. The latter depends on the choice of matrix resin. Both test specimens were made with Fiber B and had dimensions of 6×4×approximately 0.2 inches. The panels were impacted in the center with a Gardner type Impact Tester (Gardner Laboratories, Bethesda, MD) having a 5/8 inch diameter spherical indenter. The impact was normal to the plane of the fibers. When impacted, the laminate was simply supported over a 3 inch by 5 inch cut out in an aluminum plate with a plywood backup. The impacted panel was tested for residual compressive strength in a steel fixture that constrained the edges from out-of-plane buckling.

In this test, residual compressive strengths decrease as the impact load increases. The preferred samples have the highest residual compressive strengths at a given impact level.

It is clear that the residual compressive strengths of laminate made with the composition of this invention are significantly higher than those of the control. Thus, the compositions of this invention have improved impact resistance.

TABLE V

COMPRESSIVE STRENGTH (in $10^3$ psi) AFTER IMPACT RESULTS

| | EXAMPLE | |
|---|---|---|
| | 32 | CONTROL |
| PREPREG EXAMPLE | 29 | — |
| COMPOSITE PROPERTIES[a] | | |
| FIBER CONTENT (vol %) | 55.6–57.8 | 56.9 |
| THICKNESS (IN) | .207–.212 | .205 |
| LAYUP[b] | 36 ply | 36 ply |

TABLE V-continued
COMPRESSIVE STRENGTH (in 10³ psi) AFTER IMPACT RESULTS

| | EXAMPLE | |
|---|---|---|
| IMPACT LEVEL (IN LB/IN) | 32 | CONTROL |
| 0 | 70.9 | 72.7[c] |
| 1000 | 40.2 | 23.6, 24.6[c] |
| 1500 | 34.6 | 20.7[c] |

[a]Cure schedule:
Apply vacuum Heat from room temperature to 135° C. at 2° C./min Apply 90 psi Hold 3 hour at 135° C. Heat from 135° C. to 179° C. at 1° C./min Hold 4 hour at 179° C. Post Cure 4 hour at 200° C.
[b][(±45/0/90/0/90)₂/±45/0/90/±45]ₛ
[c]No post cure (200° C.)

What is claimed is:
1. A composition comprising:
   (a) a diamine hardener represented by the following general formulas:

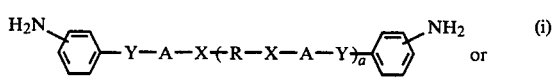  (i)

or

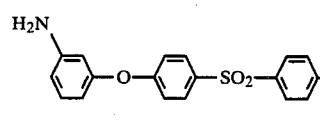  (ii)

or mixtures thereof, wherein X is O, S, SO or SO₂, Y is O or S, A is the residuum of a dihalobenzenoid compound, R is the residuum of a dihydric phenol and a is 0.05 to 20, and
   (b) an epoxy resin containing two or more 1,2-epoxide groups per molecule.

2. A composition as defined in claim 1 wherein R is selected from bisphenol A, hydroquinone, resorcinol, 4,4'-biphenol, 4,4'-dihydroxydiphenyl sulfone, 4,4'-dihydroxydiphenyl sulfide, 4,4'-dihydroxy-3,3',5,5'-tetramethyldiphenyl sulfide, and 4,4-dihydroxy-3,3',5,5'-tetramethyldiphenyl sufone.

3. A composition as defined in claim 1 wherein A is selected from:

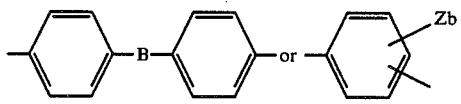

wherein B is SO₂,

—C(CH₃)₂, —C(CF₃)₂ or a direct bond, Z is halogen and b is an integer of 1 to 4.

4. A composition as defined in claim 1 wherein the diamine is of the formula:

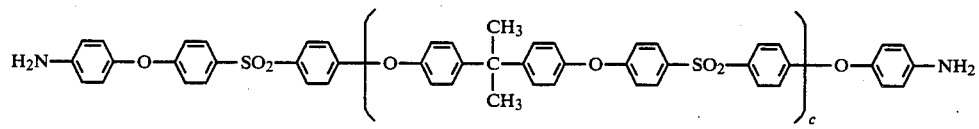

wherein c is 0.2 to 0.8.

5. A composition as defined in claim 1 wherein the diamine is of the formula:

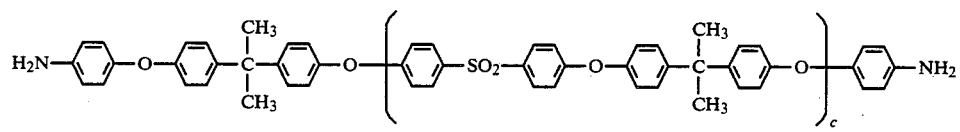

wherein c is 0.2 to 0.8.

6. A composition as defined in claim 1 wherein the diamine is of the formula:

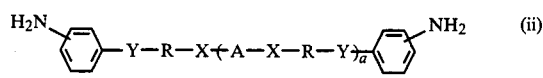

wherein c is 0.2 to 0.8.

7. A composition as defined in claim 1 wherein the diamine is of the formula:

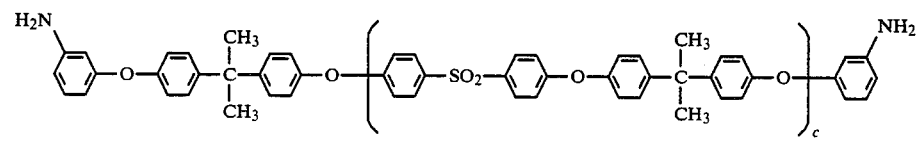

wherein c is 0.2 to 0.8.

8. A composition as defined in claim 1 wherein the epoxy resin is bis(2,3-epoxycyclopentyl)ether.

9. A composition as defined in claim 1 wherein the epoxy resin is of the following structure:

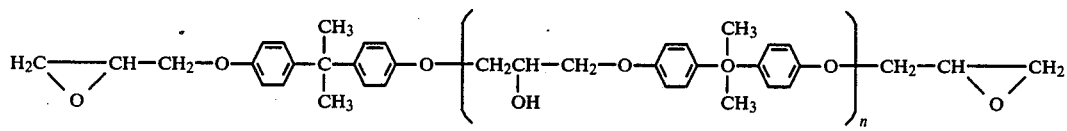

where n has a value from about 0 to about 15.

10. A composition as defined in claim 1 wherein the epoxy resin is a phenol-formaldehyde novolak of the following formula:

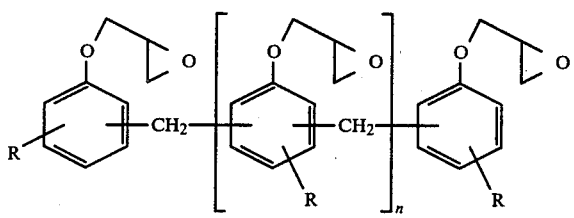

wherein n=0.1 to 8 and R=hydrogen.

11. A composition as defined in claim 1 wherein the epoxy resin is a cresol-formaldehyde novolak of the following formula:

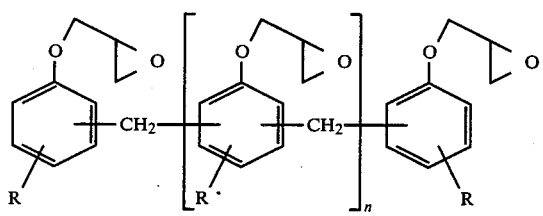

wherein n=0.1 to 8 and R is $CH_3$.

12. A composition as defined in claim 1 wherein the epoxy resin is N,N,N'N'-tetraglycidyl-4,4'-diaminodiphenyl methane.

13. A composition as defined in claim 1 wherein the epoxy resin is N,N,N',N'-tetraglycidylxylylene diamine.

14. A composition as defined in claim 1 wherein the epoxy resin is N,N-diglycidyl toluidene.

15. A composition as defined in claim 1 wherein the epoxy resin is N,N-diglycidyl aniline.

16. A composition as defined in claim 1 wherein the epoxy resin is N,N,N',N'-tetraglycidylbis(methylamino)cyclohexane.

17. A composition as defined in claim 1 wherein the epoxy resin is diglycidyl isophthalate.

18. A composition as defined in claim 1 wherein the epoxy resin is diglycidyl terephthalate.

19. A composition as defined in claim 1 wherein the epoxy resin is O,N,N-triglycidyl-4-amino phenol or O,N,N-triglycidyl-3-aminophenol.

20. A composition as defined in claim 1 wherein the epoxy resin is 3,4-epoxycyclohexylmethyl 3,4-epoxycyclohexane carboxylate.

21. A composition as defined in claim 1 wherein the epoxy resin is a N,N'-diglycidyl derivative of dimethylhydantoin.

22. A composition as defined in claim 1 which contains a structural fiber selected from carbon, graphite, glass, silicon carbide, poly(benzothiazole), poly(benzimidazole), poly(benzoxazole), alumina, titania, boron, and aromatic polyamides.

23. A composition as defined in claim 1 or 22 which contains a thermoplastic polymer.

24. A composition as defined in claim 23 wherein the thermoplastic polymer is selected from one or more of a poly(aryl ether), a polyhydroxyether, a polycarbonate, a poly(ε-caprolactone), a polybutadiene/acrylonitrile copolymer, a polyester, an acrylonitrile/butadiene/styrene copolymer, a polyamide, a poly(amide imide), a polyolefin, a polyethylene oxide, a polybutyl methacrylate, an impact-modified polystyrene, a sulfonated polyethylene, a polyacrylate, poly(2,6-dimethyl phenylene oxide), polyvinyl chloride and its copolymers, polyphenylene sulfide and a polyacetal.

25. A composition as defined in claim 24 wherein the thermoplastic polymer is a polysulfone.

26. A composition as defined in claim 24 wherein the thermoplastic polymer is a polyhydroxyether.

27. A composition as defined in claim 24 wherein the thermoplastic polymer is a polycarbonate).

28. A composition as defined in claim 24 wherein the thermoplastic polymer is a polyetherimide.

29. A composition as defined in claim 24 wherein the thermoplastic polymer is a polyarylate.

30. A composition as defined in claims 1 or 22 or 24 which contains an accelerator which increases the rate of cure.

31. A composition as defined in claim 1 which contains 5 to 70 weight percent of component (a).

32. A composition as defined in claim 1 which contains 5 to 75 weight percent of component (b).

33. A composition comprising:
(a) a diamine hardener represented by the following general formulas:

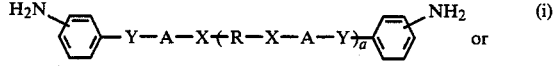

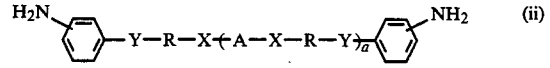

or mixtures thereof, wherein X is O, S, SO or $SO_2$, Y is O or S, A is the residuum of a dihalobenzenoid compound, R is the residuum of a dihydric phenol, and a is 0.05 to 20 and (b) bis(2,3-epoxycyclopentyl)ether.

34. A composition as defined in claim 33 which contains a structural fiber and/or thermoplastic polymer.

35. A prepreg comprising:
(a) a diamine hardener represented by the following general formulas:

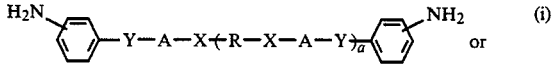

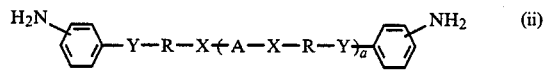

or mixtures thereof, wherein X is O, S, SO or SO$_2$, Y is O or S, A is the residuum of a dihalobenzenoid compound, R is the residuum of a dihydric phenol, and a is 0.05 to 20 and (b) an epoxy resin containing two or more 1,2-epoxide groups per molecule and (c) a structural fiber.

36. A prepreg as defined in claim 35 which contains an accelerator which increases the rate of cure.

37. A prepreg as defined in claims 35 or 36 which contains a thermoplastic polymer.

38. A composite comprising:

(i) a matrix resin comprising (a) a diamine hardener represented by the following formulas:

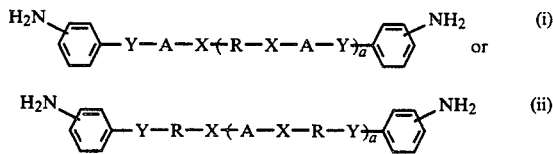

or mixtures thereof, wherein X is O, S, SO or SO$_2$, Y is O or S, A is the residuum of a dihalobenzenoid compound, R is the residuum of a dihydric phenol, and a is 0.05 to 20 and (b) an epoxy resin containing two or more 1,2-epoxide groups per molecule, and (c) a structural fiber.

39. A composite as defined in claim 38 wherein the epoxy resin was cured in the presence of an accelerator which increased the rate of cure.

40. A composite as defined in claims 38 or 39 which contains a thermoplastic polymer.

* * * * *